(12) United States Patent
Kammermeier et al.

(10) Patent No.: US 7,878,738 B2
(45) Date of Patent: Feb. 1, 2011

(54) MILLING CUTTER AND A CUTTING INSERT FOR A MILLING CUTTER

(75) Inventors: Dirk Kammermeier, Stein (DE); Nikhilesh Kumar Reddy Mylavaram, Nürnberg (DE); Martin Bernard, Neudrossenfeld (DE); Bernhard Liebl, Aurachtal (DE)

(73) Assignee: Keenametal Inc., Latrobe, PA (US)

( * ) Notice: Subject to any disclaimer, the term of this patent is extended or adjusted under 35 U.S.C. 154(b) by 281 days.

(21) Appl. No.: 11/858,525

(22) Filed: Sep. 20, 2007

(65) Prior Publication Data

US 2008/0226402 A1 Sep. 18, 2008

Related U.S. Application Data

(63) Continuation-in-part of application No. PCT/EP2006/040048, filed on Apr. 29, 2006.

(30) Foreign Application Priority Data

May 21, 2005 (DE) ................ 10 2005 023 532

(51) Int. Cl.
*B23D 1/03* (2006.01)
(52) U.S. Cl. .................. 407/114; 407/2; 407/34; 407/53; 407/100; 407/115
(58) Field of Classification Search .............. 407/2, 407/34, 53, 100, 114, 115, 116
See application file for complete search history.

(56) References Cited

U.S. PATENT DOCUMENTS 3,673,653 A 7/1972 Kaser
3,745,623 A * 7/1973 Wentorf et al. ............ 407/119
4,593,776 A * 6/1986 Salesky et al. ............ 175/375

(Continued)

FOREIGN PATENT DOCUMENTS

DE 197 16 818 11/1998

(Continued)

OTHER PUBLICATIONS

International Preliminary Report on Patentability PCT/EP2006/004048 and English translation thereof.

(Continued)

*Primary Examiner*—Jason Daniel Prone
*Assistant Examiner*—Jennifer Swinney
(74) *Attorney, Agent, or Firm*—Larry R. Meenan

(57) ABSTRACT

A milling cutter, such as a surface or face milling cutter, and a cutting insert for a milling cutter. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 3 Drawing Sheets

U.S. PATENT DOCUMENTS

| | | | |
|---|---|---|---|
| 4,854,784 A | 8/1989 | Murray et al. | |
| D306,032 S * | 2/1990 | Mihic | D15/139 |
| 5,209,611 A * | 5/1993 | Drescher | 407/48 |
| 5,348,108 A * | 9/1994 | Scott et al. | 175/432 |
| 5,924,824 A * | 7/1999 | Satran et al. | 407/34 |
| 5,944,456 A * | 8/1999 | Shirley et al. | 407/42 |
| 6,022,175 A * | 2/2000 | Heinrich et al. | 407/119 |
| 6,053,672 A * | 4/2000 | Satran et al. | 407/40 |
| 6,120,218 A | 9/2000 | Bishop et al. | |
| 6,733,215 B2 * | 5/2004 | Isaksson | 407/114 |
| 6,742,970 B2 * | 6/2004 | Oles et al. | 407/113 |
| 6,789,983 B2 * | 9/2004 | Mizutani | 407/46 |
| 6,921,233 B2 * | 7/2005 | Duerr et al. | 407/34 |
| 7,094,007 B2 * | 8/2006 | Satran et al. | 407/113 |
| 7,097,393 B2 * | 8/2006 | Satran et al. | 407/113 |
| 7,313,991 B2 * | 1/2008 | Penkert | 82/1.11 |

FOREIGN PATENT DOCUMENTS

| | | |
|---|---|---|
| DE | 20 2004 007 811 | 9/2004 |
| JP | 59134612 A * | 8/1984 |
| JP | 60127913 A * | 7/1985 |
| JP | 08141819 A * | 6/1996 |
| JP | 2000 024807 | 1/2000 |
| WO | WO 98/51436 | 11/1998 |
| WO | WO 00/44518 | 8/2000 |

OTHER PUBLICATIONS

International Search Report PCT/EP2006/004048 and English translation thereof.

* cited by examiner

MILLING CUTTER AND A CUTTING INSERT FOR A MILLING CUTTER

CONTINUING APPLICATION DATA

This application is a Continuation-In-Part application of International Patent Application No. PCT/EP2006/004048, filed on Apr. 29, 2006, which claims priority from Federal Republic of Germany Patent Application No. 10 2005 023 532.8-14, filed on May 21, 2005. International Patent Application No. PCT/EP2006/004048 was pending as of the filing date of this application. The United States was an elected state in International Patent Application No. PCT/EP2006/004048.

BACKGROUND

1. Technical Field

This application relates to milling cutter and a cutting insert for a milling cutter, such as a face milling cutter. The application further relates to a cutting bit for a tool, in particular for a milling tool, with a cutting insert comprising a workpiece face and an end face, forming a corner area where a cutting edge for metal-cutting machining of the workpiece is arranged. Furthermore, the cutting insert includes a chip-breaker face.

2. Background Information

Such cutting bits are described, for example, in DE 197 16 818 C2 or DE 20 2004 007 811 U1. These known cutting bits serve for application in a surface milling cutter, on which several of the bits are fastened on a cylindrical tool base body and are distributed over its periphery. The tool base body consists of light metal, in particular of aluminum or an aluminum alloy. Due to the relatively soft material, a chip-deflecting element or a chip breaker are provided according to the state of the art, which keeps the chip removed by metal-cutting machining of the workpiece away from the tool base body to avoid that the latter is damaged. In DE 197 16 818 C2, a chip flute of the cutting bit properly speaking is extended by an additional chip-deflecting element in a peripheral direction of the surface milling cutter. In DE 20 2004 007 811 U1, a chip breaker projecting over the contour of the cutting bit and limiting the chip flute is described for the same purpose.

These two chip-deflecting elements serve, however, only for the protection of the tool base body. In particular metal-cutting machining of soft materials, such as, for example, light-metal workpieces made of aluminum, entails the problem that die cut-off light-metal chips are very difficult to remove and show a relatively high adhesive strength. Therefore, there is the risk that such a chip might damage the workpiece surface.

OBJECT OR OBJECTS

At least one embodiment is, therefore, based on the object to provide a cutting bit which promotes a safe and reliable chip flow, thus minimizing or essentially avoiding damage to both the tool base body and the workpiece to be machined.

SUMMARY

The application teaches that this object's problem may be solved by a cutting bit for a tool, in particular for a milling tool, with a cutting insert including a workpiece face defining a machining surface defined by a radial direction and a cutting direction, an end face, adjacent to the workpiece face, defined by the cutting direction and an axial direction, a cutting edge for metal-cutting machining of a workpiece, arranged in a front corner area, viewed in a cutting direction, which is formed by the work-piece face and the end face, a chip-breaker face, extending in cutting direction beyond the cutting edge and at a distance from the latter in radial direction, wherein the chip-breaker face is oriented towards the cutting edge and extends at an acute angle $\alpha$ up to the machining surface 36. The cutting bit comprises a cutting insert, which usually has a rectangular parallel epipedal basic geometry. The cutting insert includes a workpiece face, which in mounted condition and during operation of the milling tool faces the workpiece. The workpiece face defines a machining surface which during operation coincides with the surface of the workpiece to be machined. In principle, this workpiece surface can also be curved. The machining surface is defined by a radial direction and a cutting direction of the workpiece face. The cutting insert is, furthermore, limited by an end face, which is usually perpendicular to the machining surface and forms a corner area with the workpiece face. In this corner area, a cutting edge, designed in particular as a cutting corner, is arranged for chipping or metal-cutting machining of the workpiece. To promote a substantially safe and reliable chip flow, the cutting insert comprises, furthermore, a chip-breaker face, oriented towards the cutting edge and extending at an acute angle with respect to the machining surface.

Therefore, the chip-breaker face is designed such that it merges into the machining surface as continually as possible and without an abrupt transition. Thus, altogether, a chip-deflecting element is formed which, viewed from the side or in cross-section, is wedge-shaped, the wedge "sliding" at a little distance over the surface of the workpiece and being oriented with the tip of the wedge facing the cutting edge. Through this measure, the chip removed by the cutting edge is lifted from the surface of the tool by the gradually ascending chip-breaker face and is safely removed. This avoids or minimizes damage to the tool surface.

In addition to safe chip deflection, the chip-breaker face serves for chip control. For this purpose, the chip-breaker face is expediently of a curved shape. Therefore, the chip-deflecting element including the chip-breaker face can also be qualified as a chip former.

The radial direction and the cutting direction are defined by the arrangement of, in particular, the cutting edge. As the cutting bit with the cutting edge is fastened to a rotatable tool base body, there must be sufficient clearance in front of the cutting edge in peripheral direction or direction of rotation of the milling tool. The peripheral direction or direction of rotation of the milling tool is understood to be the cutting direction. The radial direction is oriented perpendicularly to the cutting direction. In the following, it should be understood that what is meant by radial sides or faces are those faces of the cutting bit which extend parallelly or substantially parallelly to the radial direction.

Such a cutting bit is provided, together with a plurality of further cutting bits, for being fastened to a cylindrical tool base body in order to form a surface milling cutter. The cutting bit can also be used in other milling tools. The cutting bit is provided in particular for machining light-metal workpieces at high cutting or rotational speeds of the tool of up to more than 2000 m per minute.

In view of the desired safe chip flow, the acute angle preferably lies in the range of approximately 30° to 60°, and in another embodiment is approximately 45°.

The cutting insert preferably comprises a chip flute including a chip-flute wall substantially oriented in the cutting direction, which chip-flute wall includes the chip-breaker face. This chip-flute wall oriented in the cutting direction is formed in particular by the chip-breaker face. The main direction of extension of the chip-breaker face is perpendicular to the peripheral direction or direction of rotation (cutting direction) of the milling tool in operation. The wedge formed by the chip-deflecting element is, therefore, oriented in radial direction, i.e. the tip of the wedge is facing radially outwards.

According to another development or embodiment, the chip-breaker face is inclined to the axial direction at an angle of inclination. Thanks to the inclined design, the chip is reliably directed into the chip flute, while minimizing the risk of exiting the chip flute in the cutting direction.

To achieve a reliable and defined chip control and chip deflection, the chip-breaker face is, in one embodiment, curved and forms approximately a quarter circle. Therefore, the chip-breaker face extends approximately over an angular range of 90°.

According to another embodiment, the chip flute comprises a radial chip-flute wall extending in a substantially radial direction and oriented towards the end face. At least in the area of the end face, the radial chip-flute wall is inclined to the end face at a radial angle of inclination, so that an angle <90 is formed between the radial chip-flute wall and the end face. Therefore, the radial chip-flute wall does not run out perpendicularly to the boundary surface on the end face of the cutting bit, but forms with this boundary surface an acute angle, so that here, too, a kind of chip-breaker wedge is formed, which directs the chip safely into the chip flute.

Due to the intended high cutting speeds of high-speed milling of up to over 2000 m per minute, i.e. the speed of rotation of the tool is such that a point on the periphery of the tool travels 2000 m per minute, very high radial forces are acting upon the cutting bit. To promote or essentially guarantee a defined position of the cutting bit during high-speed milling operations, a protruding element is provided for radial locking. This protruding element projects over a cutting-insert bearing face extending in radial direction, with which the cutting bit is clamped against a counter-support on the tool base body. Therefore, the protruding element forms in mounted condition a positive locking which is effective in radial direction. This design can in principle also be used independently of the special geometry and arrangement of the chip-breaker face and may be used for cutting bits intended for a high-speed milling application. In connection with the chip breaker, this design for radial locking offers the particular advantage that the defined specified position of the entire cutting bit, necessary for the specific chip flow, is maintained during the operation. The filing of a divisional application for this aspect, independently of the special design of the chip-breaker face, is reserved.

To promote the simplest design possible, the cutting insert comprises a base body and a cutting element fastened to it, which includes the cutting edge. This cutting element is designed in particular in the manner of a cutting plate and is firmly joined to the base body by gluing or by brazing or other suitable method of joining.

To achieve good cutting results, in particular in light-metal machining, the cutting element according to one embodiment comprises a diamond or a boron-nitride cutting material. In one embodiment, polycrystalline diamond or polycrystalline boron nitride are used here. Alternatively, carbide or ceramic can also be used as cutting materials for the cutting element.

In another possible embodiment, the base body is manufactured and formed by means of a sintering process. The design as a sintered base body enables an economic manufacture even of complex geometries with the desired properties of the material. In particular for the special geometry of the chip-breaker face described here, other manufacturing variants are complicated and, therefore, expensive. The formation of the cutting bit or its base body as a sintered body can be used for cutting bits in general and is not limited to a cutting bit with the special geometry of the chip-breaker face described here. The filing of a divisional application for this aspect, independently of the special design of the chip-breaker face, is reserved.

The sintered base body can in this case be made of a metal powder. Its basic material is preferably iron, with admixtures of nickel and copper. In at least one embodiment, the share of nickel lies in the range of approximately 3.5-4.5% in weight, the share of copper, in the range of approximately 1.2-1.8% in weight. Furthermore, a share of molybdenum in the range of approximately 0.4-0.6% in weight is provided. The remaining shares are iron. In addition, the sintered base body includes additives, in particular in the range of 0.7-0.9% in weight, which are added as sintering aids.

To promote a substantially safe, trouble-free chip deflection while minimizing friction, the cutting bit according to another possible embodiment is provided with a suitable coating, at least in partial areas. This coating is a sliding layer or a hard-material coating. It may be applied in those areas of the cutting bit which get into contact with the chips. Such areas include the chip-breaker face as well as the other chip-flute walls defining the chip flute. In principle, it is also possible to provide the entire cutting bit with the coating. Only the cutting element provided with the cutting edge has to be covered during the coating process in order to avoid a coating of the cutting edge. Suitable sliding layers include an $MoS_2$ layer or a DLC (diamond-like carbon) layer. A suitable hard-material layer would be, for example, a TiAlN layer or a $TiB_2$ layer.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one embodiment of the application will be described in detail in the following, by means of the drawing, in which, in schematic and partly simplified representation.

In the figures, parts having identical effects are marked with identical reference numbers.

DESCRIPTION OF EMBODIMENT OR EMBODIMENTS

Figure 1A:
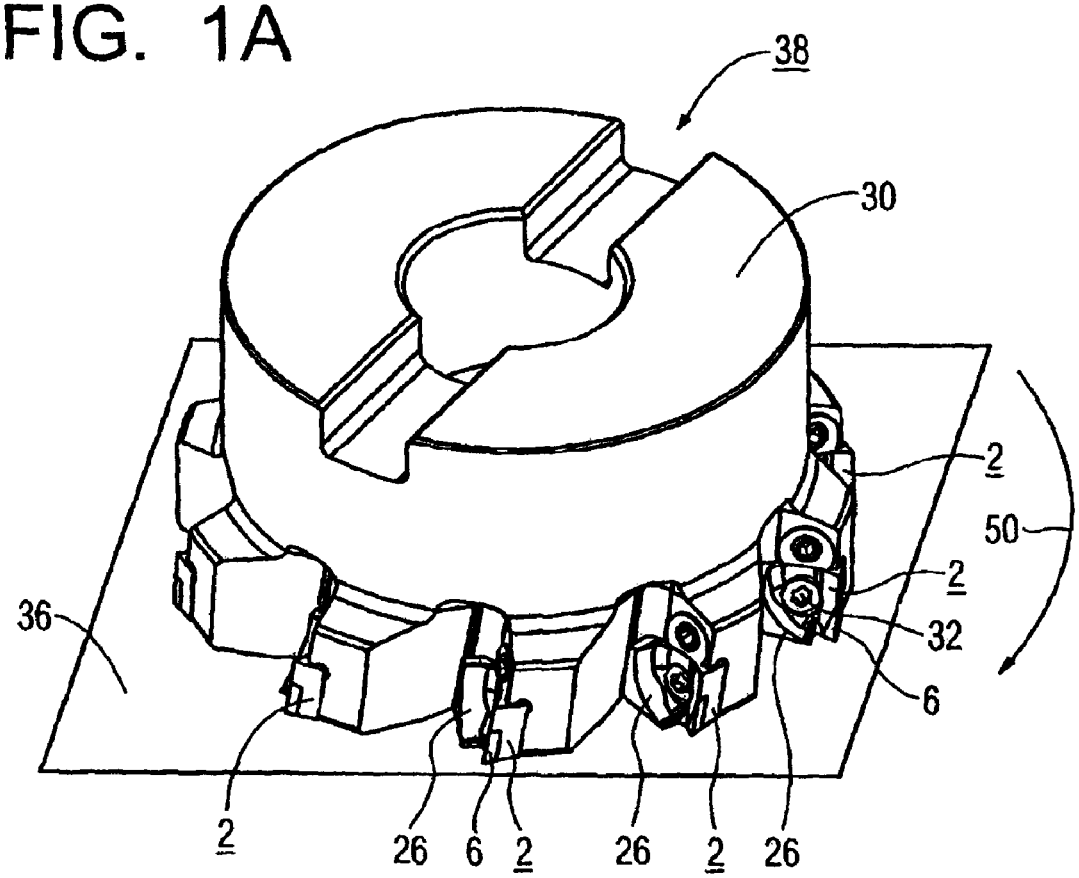
FIG. 1A is a perspective view of a surface milling cutter with a plurality of cutting bits arranged along the periphery.

FIG. 1A shows a surface or face milling cutter 38 with cutting inserts 2 distributed over its circumference. The individual cutting inserts 2 are mounted in pocket-like recesses of the tool base body 30. Alternatively, the cutting inserts 2 can also be mounted in cassettes which are provided for that purpose and fastened on the tool base body 30. The cutting-insert support faces 20 as well as a bearing face 18 of the individual cutting inserts 2 are clamped against corresponding counter-bearing faces of the tool base body 30. The latter is provided with a recess, not recognizable here, for receiving the protruding element 34. The protruding element 34 lies in this recess with a positive fit, so that a positive locking acting in radial direction 42 is given. The direction of rotation 50 of the surface milling cutter 38 during milling is indicated by an arrow. The tool base body 30, in at least one embodiment, comprises light metal.

The cutting bit represented in FIGS. 1 to 5 comprises an integral cutting insert 2, which in turn comprises a sintered base body 4 and a cutting element 6 fastened to the latter, such as by brazing. As is evident from FIGS. 1 and 2, the cutting element 6 is a cutting plate of prism-like shape. The cutting element 6 comprises a polycrystalline diamond material. The base body 4 is made by a sintering process of a metal powder. By means of this shaping and manufacturing method of the base body 4, the complex geometry of the embodiment can be produced in an economic way and with relatively low expenditure.

The cutting element 6 includes a cutting edge 8, designed in particular as a cutting corner. When machining a metal workpiece, this cutting edge 8 is in engagement with the surface of the workpiece.

The cutting insert 2 has altogether an approximately parallel epipedal basic geometry, part of this parallel epipedal basic geometry being free from material and constituting a chip flute 10. The cutting insert 2 has a bottom workpiece face 12 assigned to the workpiece during the machining operation and, opposite to it, a top side 14, which is approximately parallel to it. The other four sides of the parallelepiped lying between these two sides 12, 14 are a front end face 16, which is at least substantially perpendicular to the workpiece face 12, a bearing face 18, which is parallel to the latter, a cutting-insert support face 20 as well as, opposite to the cutting-insert support face 20, a chip-flute face 22. The chip flute 10 itself is defined by a radial chip-flute wall 24 and another chip-flute wall, which is approximately perpendicular to it and which is designed as a chip-breaker face 26.

Approximately in the center of the radial chip-flute wall 24, a through hole 28 is provided, through which a fastening element, such as a fastening screw 32, is passed for fastening to a tool base body 30 (see FIG. 7).

Furthermore, the cutting insert 2 includes on its cutting-insert support face 20 a protruding element 34 projecting from that face. The latter has substantially the shape of an elongated parallelepiped with an insertion bevel and is in alignment with the axial bearing face 18. Thus, the protruding element 34 is arranged in the rear area remote from the cutting edge 8. As is evident from FIG. 2, the protruding element 34 is set back from the top side 14 by an offset.

The workpiece face 12 substantially defines a machining surface 36, as shown in FIG. 7. This machining surface 36 corresponds to the plane defined by the individual cutting corners of the cutting edges 8 of the surface milling cutter 38 shown in FIG. 7.

In general, the cutting insert 2 is fastened to the rotatable, substantially cylindrical tool base body 30. The free end of the cutting element 6 is oriented towards the chip flute 10 and in the direction of rotation or peripheral direction. This peripheral direction is in the following referred to as cutting direction 40. Perpendicular to it, a radial direction 42 is defined. Together, they define the machining surface 36. An axial direction 44 is oriented perpendicularly to this surface.

Figure 1:
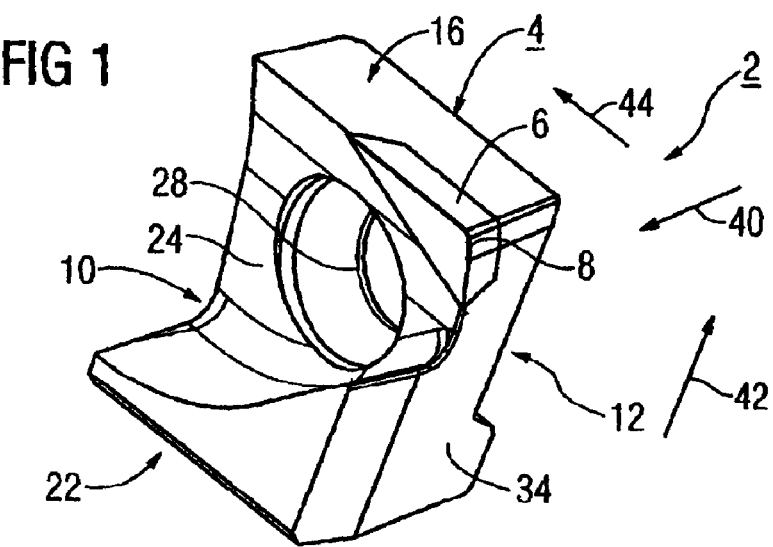
FIG. 1 is a view of a cutting bit in a first perspective representation.
Figure 2:
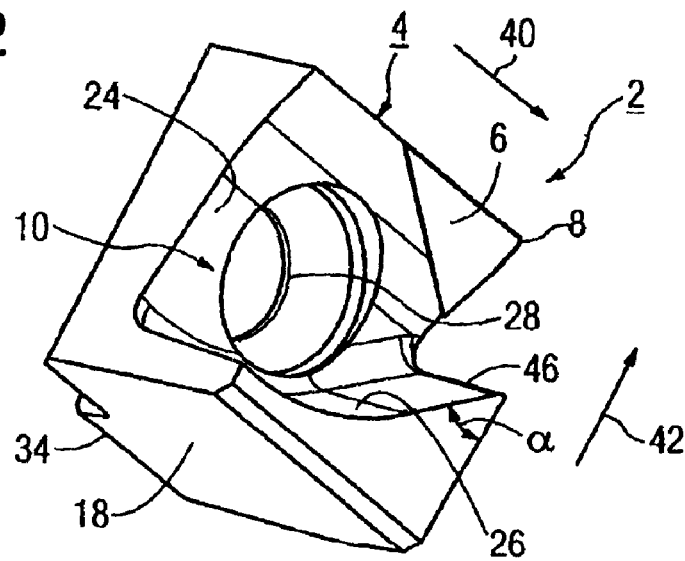
FIG. 2 is a view of the cutting bit in a second perspective representation.

As is evident from the perspective view of FIG. 2, the chip-breaker face 26 forms the surface of a chip-breaker element integrally formed into the cutting insert 2. The chip-breaker element latter is shaped like a wedge whose tip is oriented towards the cutting element 6. The surface of the wedge is formed by the chip-breaker face 26. The bottom side of the wedge is formed by the workpiece face 12 oriented towards the workpiece. Therefore, during machining of the workpiece, the wedge-shaped chip-deflecting element almost rests on the surface of the workpiece. The chip-breaker face 26 runs out towards the machining surface 36, forming an acute wedge angle $\alpha$. The front edge 46, limiting the chip-breaker face 26, is set back in radial direction 42 from the cutting element 6. In one embodiment, the wedge angle $\alpha$ is approximately 50°. The definition of the wedge angle $\alpha$ is best seen in the view of FIG. 4.

Figure 3:
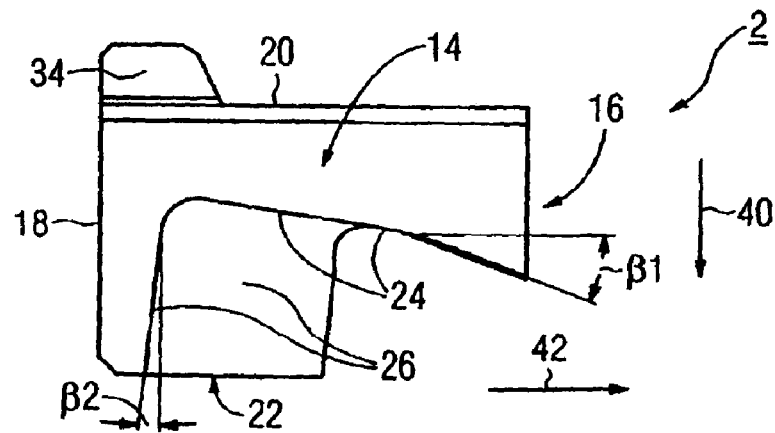
FIG. 3 is a top view of the top side of the cutting bit according to FIGS. 1 and 2 in a schematic representation.

As is evident from the views of FIGS. 2 and 3, the cutting insert 2 is provided with a second chip-breaker wedge, which is formed by the front end face 16 and the course of the radial chip-flute wall 24 in the area of the front end face 16. In the area of the cutting element 6, the radial chip-flute wall 24 extends at a radial angle of inclination $\beta1$ to the radial direction 42. The radial angle of inclination $\beta1$ lies preferably in the range of 20° to 45°. In the exemplary embodiment, it is approximately 30°.

Just like the radial chip-flute wall 24, the chip-flute wall forming the chip-breaker face 26 is also inclined to the cutting direction 40 by an angle of inclination $\beta2$, as is evident from FIG. 3. The angle of inclination $\beta2$ lies, for example, in the range of 15° to 30°.

Figure 4:
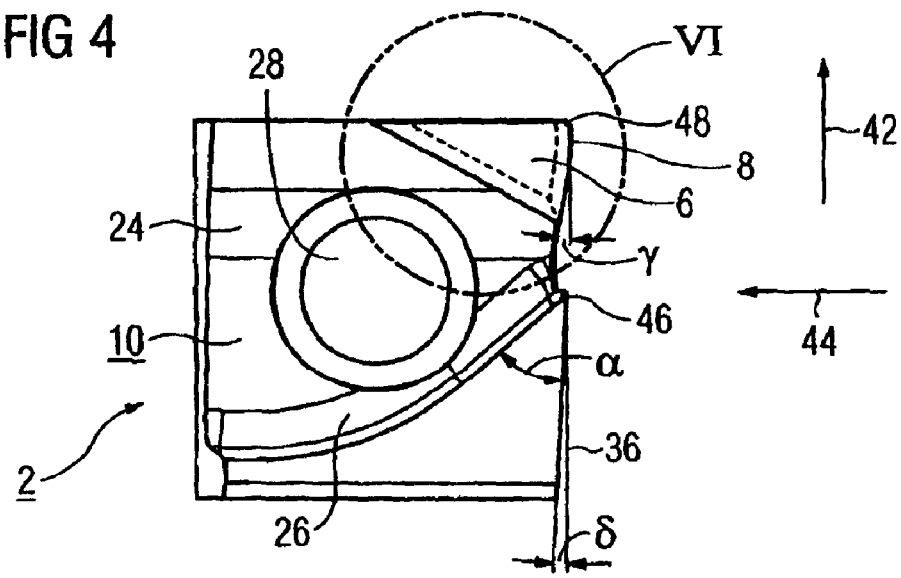
FIG. 4 is a front view of a chip-flute face of the cutting bit.
Figure 5:
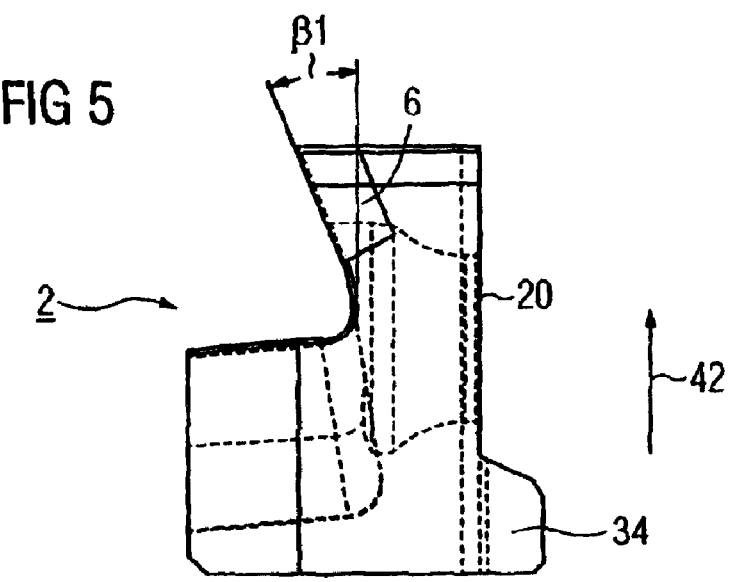
FIG. 5 is a top view from below of a workpiece face of the cutting bit.
Figure 6:
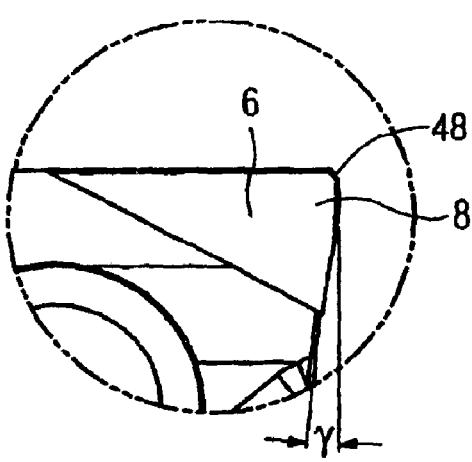
FIG. 6 is a detail view of the area marked in FIG. 4 by a circle, in which a cutting element is arranged.

Further details of the cutting insert 2 are evident from FIG. 4 to 6. FIG. 4 is a top view of the chip-flute face 22, in which the wedge angle $\alpha\alpha$ and the curved course of the chip-breaker face 26 can be seen. The latter extends approximately along part of a circle and over an angular range of approximately 90°. Furthermore, it is evident from FIG. 4 that in radial direction 42, adjacent to the cutting edge 8, the cutting element 6 has a positive rake angle $\gamma$ in the range of approximately 10°. The bottom side of the chip-breaker element (bottom side of the wedge) oriented towards the workpiece face 12 is set back a little from the machining face 36 or machining plane and is slightly inclined to the latter in radial direction 42. The corresponding angle of inclination $\delta$ is in the exemplary embodiment approximately 3°.

FIG. 5 is a view of the cutting insert 2 shown in FIG. 4, rotated anticlockwise by 90°, so that FIG. 5 is a top view from below of the workpiece face 12 facing the workpiece to be machined. In this representation, the angle of inclination $\beta1$, which is in this case 22°, can be seen very well. Furthermore, the protruding element 34 is clearly evident from FIG. 5.

FIG. 6 is an enlarged view of the cutting-edge area marked with a circle in FIG. 4. From FIG. 4 and FIG. 6, it is evident that the cutting element 6 is flush with the front end face 16 and in the edge area facing the workpiece face 12 forms the cutting edge 8. In the edge area, the cutting edge 8 is provided with a chamfer 48.

The cutting insert 2 described here is characterized by a very efficient and reliable chip flow, in particular during high-speed milling of light-metal workpieces. The chip-breaker face 26 running out towards the machining surface 36 at an acute angle promotes a substantially safe chip deflection and a defined chip control, thus minimizing damage to both the milling tool 38 and the workpiece to be machined. The specific chip guidance is further supported by the design of the chip-breaker face 26 and the radial chip-flute wall 24, which are inclined to each other, so that the chip is guided into the chip flute and then deflected in Z-direction away from the workpiece surface to be machined.

The cutting bit (2) is provided, such as for high-speed milling of light metals, such as aluminum. To promote a reliable and defined chip flow as well as a defined chip control, the cutting bit includes a chip-breaker face (26), which is oriented towards a cutting edge (8) and extends at an acute angle ($\alpha$) up to a machining surface (36).

One feature or aspect of an embodiment is believed at the time of the filing of this patent application to possibly reside broadly in a cutting bit for a tool, in particular for a milling tool 38, with a cutting insert 2 including a workpiece face 12 defining a machining surface 36 defined by a radial direction 42 and a cutting direction 40, an end face 16, adjacent to the workpiece face 12, defined by the cutting direction 40 and an axial direction 44, a cutting edge 8 for metal-cutting machining of a workpiece, arranged in a front corner area, viewed in a cutting direction 40, which is formed by the work-piece face 12 and the end face 16, a chip-breaker face 26, extending in cutting direction 40 beyond the cutting edge 8 and at a distance from the latter in radial direction 42, wherein the chip-breaker face 26 is oriented towards the cutting edge and extends at an acute angle $\alpha$ up to the machining surface 36.

Another feature or aspect of an embodiment is believed at the time of the filing of this patent application to possibly reside broadly in cutting bit, wherein the acute angle $\alpha$ lies in the range of approximately 30° to 60° and is in particular approximately 45°.

Yet another feature or aspect of an embodiment is believed at the time of the filing of this patent application to possibly reside broadly in cutting bit, wherein the cutting insert 2 includes a chip flute 10 with a chip-flute wall oriented in cutting direction 40 and comprising the chip-breaker face 26.

Still another feature or aspect of an embodiment is believed at the time of the filing of this patent application to possibly reside broadly in a cutting bit, wherein the chip-breaker face 26 is arranged with an inclination towards the cutting direction 40 at an angle of inclination β2.

A further feature or aspect of an embodiment is believed at the time of the filing of this patent application to possibly reside broadly in a cutting bit, wherein the chip-breaker face 26 is curved and forms approximately a quarter circle.

Another feature or aspect of an embodiment is believed at the time of the filing of this patent application to possibly reside broadly in a cutting bit, wherein the chip flute 10 includes a chip-flute wall 24, which extends approximately in radial direction 42 and is arranged at an inclination towards the end face 16, at a radial angle of inclination β1 to the radial direction 42, so that between the chip-flute wall 24 and the end face an angle of <90° is formed.

Yet another feature or aspect of an embodiment is believed at the time of the filing of this patent application to possibly reside broadly in a cutting bit, wherein the cutting insert 2 includes a cutting-insert support face 20, extending in radial direction 42, for location at the tool, from which a protruding element 34 projects.

Still another feature or aspect of an embodiment is believed at the time of the filing of this patent application to possibly reside broadly in a cutting bit, wherein the cutting insert 2 comprises a base body 4 and a cutting element 6 fastened on it, which includes the cutting edge 8.

A further feature or aspect of an embodiment is believed at the time of the filing of this patent application to possibly reside broadly in a cutting bit, wherein the cutting element 6 comprises a diamond cutting material or a boron nitride cutting material.

Another feature or aspect of an embodiment is believed at the time of the filing of this patent application to possibly reside broadly in a cutting bit, wherein the base body 4 is a sintered base body 4.

Yet another feature or aspect of an embodiment is believed at the time of the filing of this patent application to possibly reside broadly in a cutting bit, wherein the sintered base body 4 is made of a metal powder.

One feature or aspect of an embodiment is believed at the time of the filing of this patent application to possibly reside broadly in a cutting bit, wherein the basic material of the sintered base body 4 is iron with admixtures of nickel and copper.

Another feature or aspect of an embodiment is believed at the time of the filing of this patent application to possibly reside broadly in a cutting bit, wherein the sintered base body 4 is composed of nickel in the range of approximately 3.5-4.5% in weight, of copper in the range of approximately 1.2-1.8% in weight, of molybdenum in the range of approximately 0.4-0.6% in weight, the remainder being iron.

Yet another feature or aspect of an embodiment is believed at the time of the filing of this patent application to possibly reside broadly in a cutting bit, wherein it is provided at least in the area of the chip-breaker face 26 with a sliding layer or a hard-material coating.

Still another feature or aspect of an embodiment is believed at the time of the filing of this patent application to possibly reside broadly in a milling tool, in particular surface milling cutter 38, with several cutting bits.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Some examples of face milling cutters and components thereof, such as cutting inserts, which may possibly be utilized or adapted for use in at least one possible embodiment may possibly be found in the following U.S. Pat. Nos. 7,125,210, entitled "Face Milling Cutter;" 6,200,072, entitled "Face-milling Method and Apparatus;" 5,957,628, entitled "Face Milling Cutter or Angular Milling Cutter;" 7,168,512, entitled "Cutting Insert and Milling Cutter with Such a Cutting Insert;" and 6,742,969, entitled "Milling Cutter Insert with Chip Control and Milling Cutter Using Same."

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the international search report mailed Aug. 4, 2006, and/or cited elsewhere are hereby incorporated by reference as if set forth in their entirety herein as follows: U.S. Pat. No. 4,854,784 A; U.S. Pat. No. 6,120,218 A; U.S. Pat. No. 3,673,653 A; DE 197 16 818 A1; DE 20 2004 007811 U1; JP 2000 024807 A; WO 98/51436 A; WO 00/44518 A.

The corresponding foreign and international patent publication applications, namely, Federal Republic of Germany Patent Application No. 10 2005 023 532.8-14, filed on May 21, 2005, having inventors Dirk KAMMERMEIER, Nikhilesh Kumar Reddy MYLAVARAM, Martin BERNARD, and Bernhard LIEBL, and DE-OS 10 2005 023 532.8-14 and DE-PS 10 2005 023 532.8-14, and International Application No. PCT/EP2006/004048, filed on Apr. 29, 2006, having WIPO Publication No. WO2006/125508 and inventors Dirk KAMMERMEIER, Nikhilesh Kumar Reddy MYLAVARAM, Martin BERNARD, and Bernhard LIEBL are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A face milling cutter for cutting aluminum, said face milling cutter comprising:
    a rotary tool body comprising one of: aluminum and an aluminum alloy;
    said tool body comprising a shank end and a cutting end;
    said shank end being configured to be connected to a tool holder to permit rotation of said tool body about a central rotational axis, and radial and axial movement of said tool body with respect to the central rotational axis, in a cutting process;
    said cutting end having an end face being configured to face toward a machining surface of a workpiece to be cut during a cutting process;
    said cutting end comprising a plurality of receiving pockets disposed about the periphery thereof;
    a plurality of cutting inserts;
    each of said plurality of cutting inserts being disposed in a corresponding one of said plurality of receiving pockets;
    each of said cutting inserts comprising a through hole;
    a plurality of fastening screws;
    each of said fastening screws being disposed to pass through a corresponding one of said through holes to fasten said cutting inserts to said tool body;
    each of said cutting inserts further comprising:
        a workpiece face (12) being disposed to extend along a substantially radial direction away from the central rotational axis of said tool body;
        said workpiece face (12) being configured and disposed to face toward a machining surface of a workpiece to be cut during a cutting process;
        a front end face (16) being disposed adjacent and substantially perpendicular to said workpiece face (12), and to face radially outward and away from the central rotational axis of said tool body;
        said front end face (16) being configured and disposed to be disposed substantially transverse to a machining surface of a workpiece to be cut during a cutting process;
        a chip-flute wall being disposed substantially transverse to each of said workpiece face (12) and said front end face (16), and to extend along a substantially radial direction away from the central rotational axis of said tool body;
        said chip-flute wall being configured and disposed to be disposed substantially transverse to a machining surface of a workpiece to be cut during a cutting process;
        a cutting edge (8) being disposed at a corner area formed at the intersection of said workpiece face (12), said front end face (16), and said chip-flute wall;
        a chip-breaker wedge being disposed to project out of and away from said chip-flute wall substantially in the direction of rotation said rotary tool body;
        said cutting edge (8) being disposed radially further from said central rotational axis of said tool body than said chip-breaker wedge;
        said chip-breaker wedge comprising a chip-breaker surface (26) and a bottom side disposed at an acute angle α with respect to said chip-breaker surface (26);
        said bottom side being configured and disposed to face a machining surface of a workpiece to be cut during a cutting process;
        said chip-breaker surface (26) being configured and disposed to face away from a machining surface of a workpiece to be cut during a cutting process;
        said chip-breaker surface (26) being configured and disposed to be disposed at an acute angle α to a machining surface of a workpiece to be cut during a cutting process; and
        said chip-breaker surface (26) being configured and disposed to guide a substantial number of aluminum chips produced during cutting of an aluminum workpiece away from both the workpiece and said tool body to minimize damage to the workpiece and said tool body caused by the chips.

2. The face milling cutter according to claim 1, wherein the acute angle α is approximately 45°.

3. The face milling cutter according to claim 2, wherein:
    the chip-breaker surface is arranged with an inclination towards the cutting direction at an angle of inclination;
    the chip-breaker surface is curved and forms approximately a quarter circle;
    the chip-flute wall is arranged at an inclination towards the front end face (16), at a radial angle of inclination (β1) to the radial direction, so that between the chip-flute wall and the front end face (16) an angle of <90° is formed;
    the cutting insert includes a cutting-insert support face, extending in radial direction, for location at the tool, from which a protruding element projects; and
    the cutting insert comprises a base body and a cutting element fastened on it, which includes the cutting edge (8).

4. The face milling cutter according to claim 3, wherein:
    the cutting element comprises a diamond cutting material or a boron nitride cutting material;
    the base body is a sintered base body;
    the sintered base body is made of a metal powder;
    the basic material of the sintered base body is iron with admixtures of nickel and copper;
    the sintered base body is composed of nickel in the range of approximately 3.5-4.5% in weight, of copper in the range of approximately 1.2-1.8% in weight, of molybdenum in the range of approximately 0.4-0.6% in weight, the remainder being iron; and
    the cutting insert is provided at least in the area of the chip-breaker surface with a sliding layer or a hard-material coating.

5. A milling cutter for cutting light metals, said milling cutter comprising:
    a rotary tool body comprising a light metal;
    said tool body comprising a shank end and a cutting end;
    said shank end being configured to be connected to a tool holder to permit rotation of said tool body about a central rotational axis, and radial and axial movement of said tool body with respect to the central rotational axis, in a cutting process;
    said cutting end having an end face being configured to face toward a machining surface of a workpiece to be cut during a cutting process;

said cutting end comprising a plurality of receiving pockets disposed about the periphery thereof;

a plurality of cutting inserts;

each of said plurality of cutting inserts being disposed in a corresponding one of said plurality of receiving pockets; and each of said cutting inserts further comprising:

a workpiece face being disposed to extend along a substantially radial direction away from the central rotational axis of said tool body;

said workpiece face being configured and disposed to face toward a machining surface of a workpiece to be cut during a cutting process;

a front end face being disposed adjacent and substantially perpendicular to said workpiece face;

a chip-flute wall being disposed substantially transverse to each of said workpiece face and said front end face;

a cutting edge being disposed at a corner area formed at the intersection of said workpiece face, said front end face, and said chip-flute wall;

a chip-breaker wedge being disposed to project out of and away from said chip-flute wall;

said cutting edge being disposed radially further from said central rotational axis of said tool body than said chip-breaker wedge;

said chip-breaker wedge comprising a chip-breaker surface and a bottom side disposed at an acute angle with respect to said chip-breaker surface;

said bottom side being configured and disposed to face a machining surface of a workpiece to be cut during a cutting process;

said bottom side being connected to and disposed to extend from said workpiece face;

said chip-breaker surface being disposed to face substantially toward said corner area;

said chip-breaker surface being configured and disposed to face away from a machining surface of a workpiece to be cut during a cutting process;

said chip-breaker surface being configured and disposed to be disposed at an acute angle to a machining surface of a workpiece to be cut during a cutting process; and said chip-breaker surface being configured and disposed to guide a substantial number of chips produced during cutting of a workpiece away from both the workpiece and said tool body in which said cutting inserts are mounted to minimize damage to the workpiece and said tool body caused by the chips.

6. The milling cutter according to claim 5, wherein the acute angle lies in the range of approximately 30° to 60°.

7. The milling cutter according to claim 6, wherein the acute angle is approximately 45°.

8. The milling cutter according to claim 7, wherein the chip-breaker surface is arranged with an inclination towards the cutting direction at an angle of inclination ($\beta 2$).

9. The milling cutter according to claim 8, wherein:

the chip-breaker surface is curved and forms approximately a quarter circle;

the chip-flute wall, is arranged at an inclination towards the front end face, at a radial angle of inclination ($\beta 1$) to the radial direction, so that between the chip-flute wall and the front end face an angle of <90° is formed;

the cutting insert includes a cutting-insert support face, extending in radial direction, for location at the tool, from which a protruding element projects; and the cutting insert comprises a base body and a cutting element fastened on it, which includes the cutting edge.

10. The milling cutter according to claim 9, wherein:

the cutting element comprises a diamond cutting material or a boron nitride cutting material;

the base body is a sintered base body;

the sintered base body is made of a metal powder;

the basic material of the sintered base body is iron with admixtures of nickel and copper;

the sintered base body is composed of nickel in the range of approximately 3.5-4.5% in weight, of copper in the range of approximately 1.2-1.8% in weight, of molybdenum in the range of approximately 0.4-0.6% in weight, the remainder being iron; and the cutting insert is provided at least in the area of the chip-breaker surface with a sliding layer or a hard-material coating.

11. The milling cutter according to claim 5, wherein:

said front end face (16) is configured and disposed to be disposed substantially transverse to a machining surface of a workpiece to be cut during a cutting process;

said chip-flute wall is disposed to extend along a substantially radial direction away from the central rotational axis of said tool body;

said chip-flute wall is configured and disposed to be disposed substantially transverse to a machining surface of a workpiece to be cut during a cutting process;

said chip-breaker wedge is disposed to project substantially in the direction of rotation of said rotary tool body; and said chip-breaker surface (26) is disposed substantially transverse and at an acute angle to said workpiece face (12).

12. A cutting insert for a milling cutter comprising:

a workpiece face being configured and disposed to face toward a machining surface of a workpiece to be cut during a cutting process;

a front end face being disposed adjacent and substantially perpendicular to said workpiece face;

a chip-flute wall being disposed substantially transverse to each of said workpiece face and said front end face;

a cutting edge being disposed at a corner area formed at the intersection of said workpiece face, said front end face, and said chip-flute wall;

a chip-breaker wedge being disposed to project out of and away from said chip-flute wall;

said chip-breaker wedge comprising a chip-breaker surface and a bottom side disposed at an acute angle with respect to said chip-breaker surface;

said bottom side being configured and disposed to face a machining surface of a workpiece to be cut during a cutting process;

said bottom side being connected to and disposed to extend from said workpiece face;

said chip-breaker surface being disposed to face substantially toward said corner area;

said chip-breaker surface being configured and disposed to face away from a machining surface of a workpiece to be cut during a cutting process;

said chip-breaker surface being configured and disposed to be disposed at an acute angle to a machining surface of a workpiece to be cut during a cutting process; and said chip-breaker surface being configured and disposed to guide a substantial number of chips produced during cutting of a workpiece away from both the workpiece and a tool body in which said cutting inserts are mounted to minimize damage to the workpiece and the tool body caused by the chips.

13. The cutting insert according to claim 12, wherein the acute angle lies in the range of approximately 30° to 60°.

14. The cutting insert according to claim 13, wherein the acute angle is approximately 45°.

15. The cutting insert according to claim 14, wherein the chip-breaker surface is arranged with an inclination towards the cutting direction at an angle of inclination ($\beta 2$).

16. The cutting insert according to claim 15, wherein:
the chip-breaker surface is curved and forms approximately a quarter circle;
the chip chip-flute wall is arranged at an inclination towards the front end face, at a radial angle of inclination ($\beta 1$) to the radial direction, so that between the chip-flute wall and the front end face an angle of <90° is formed;
the cutting insert includes a cutting-insert support face, extending in radial direction, for location at the tool, from which a protruding element projects; and
the cutting insert comprises a base body and a cutting element fastened on it, which includes the cutting edge.

17. The cutting insert according to claim 16, wherein:
the cutting element comprises a diamond cutting material or a boron nitride cutting material;
the base body is a sintered base body; and
the sintered base body is made of a metal powder.

18. The cutting insert according to claim 17, wherein:
the basic material of the sintered base body is iron with admixtures of nickel and copper;
the sintered base body is composed of nickel in the range of approximately 3.5-4.5% in weight, of copper in the range of approximately 1.2-1.8% in weight, of molybdenum in the range of approximately 0.4-0.6% in weight, the remainder being iron; and
the cutting insert is provided at least in the area of the chip-breaker surface with a sliding layer or a hard-material coating.

19. The cutting insert according to claim 18, wherein:
said front end face (16) is configured and disposed to be disposed substantially transverse to a machining surface of a workpiece to be cut during a cutting process;
said chip-flute wall is disposed to extend along a substantially radial direction away from the central rotational axis of said tool body;
said chip-flute wall is configured and disposed to be disposed substantially transverse to a machining surface of a workpiece to be cut during a cutting process;
said chip-breaker wedge is disposed to project substantially in the direction of rotation said rotary tool body; and
said chip-breaker surface (26) is disposed substantially transverse and at an acute angle to said workpiece face (12).

20. The cutting insert according to claim 12, wherein:
said front end face (16) is configured and disposed to be disposed substantially transverse to a machining surface of a workpiece to be cut during a cutting process;
said chip-flute wall is disposed to extend along a substantially radial direction away from the central rotational axis of said tool body;
said chip-flute wall is configured and disposed to be disposed substantially transverse to a machining surface of a workpiece to be cut during a cutting process;
said chip-breaker wedge is disposed to project substantially in the direction of rotation said rotary tool body; and
said chip-breaker surface (26) is disposed substantially transverse and at an acute angle to said workpiece face (12).

* * * * *